United States Patent [19]

Wernstedt

[11] 3,977,256
[45] Aug. 31, 1976

[54] ROTATIONAL ACCELERATION SENSOR AND METHOD

[76] Inventor: Gunnar Wernstedt, Ljuskansv. 23, 13300 Saltsjobaden, Sweden

[22] Filed: Oct. 25, 1974

[21] Appl. No.: 518,166

[52] U.S. Cl. ............................................... 73/515
[51] Int. Cl.² ........................................ G01P 15/02
[58] Field of Search ............... 73/515, 516 LM, 514, 73/517 A

[56] References Cited
UNITED STATES PATENTS

| | | | |
|---|---|---|---|
| 2,322,003 | 6/1943 | Farmer | 73/516 LM X |
| 2,347,962 | 5/1944 | Oliver | 73/516 LM |
| 3,810,393 | 5/1974 | MacDonald | 73/516 LM X |

FOREIGN PATENTS OR APPLICATIONS

| | | | |
|---|---|---|---|
| 1,263,358 | 5/1961 | France | 73/516 LM |

*Primary Examiner*—James J. Gill
*Attorney, Agent, or Firm*—Bell, Seltzer, Park & Gibson

[57] ABSTRACT

A device for responding to rotational acceleration of the type having a looped conduit and in which a fluid filled housing has first and second expansible chambers each having a movable wall, with the movable walls being mounted for generally coaxial movement upon expansion of the volume of one of the chambers and simultaneous contraction of the volume of the other. Fluid pressure at one distal side of the loop is transmitted to fluid filling one of the chambers and fluid pressure at the other distal side of the loop is transmitted to the other chamber. Upon movement of the movable walls, a control device such as a wheel brake control is actuated. Preferably the sensor device is a two part device with one part mounted on a wheel hub and the other mounted on a wheel, with the wheel parts being identical so that any wheel so equipped may properly cooperate with any hub so equipped irrespective of the normal direction of rotation of a wheel so mounted.

25 Claims, 9 Drawing Figures

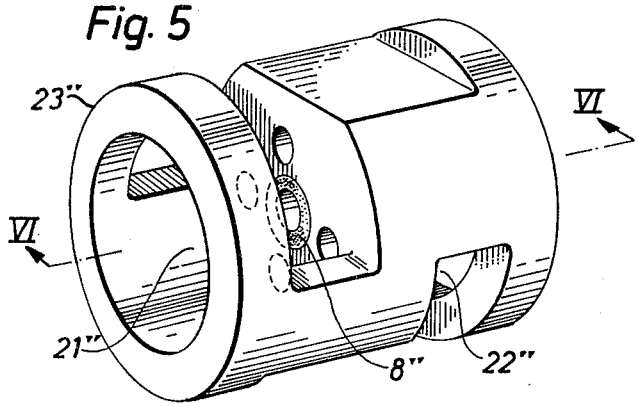
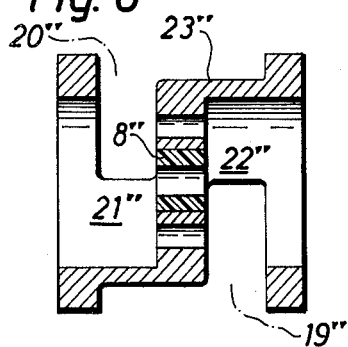
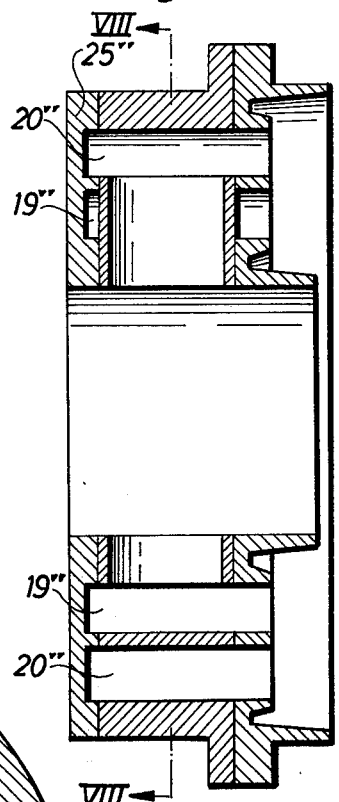
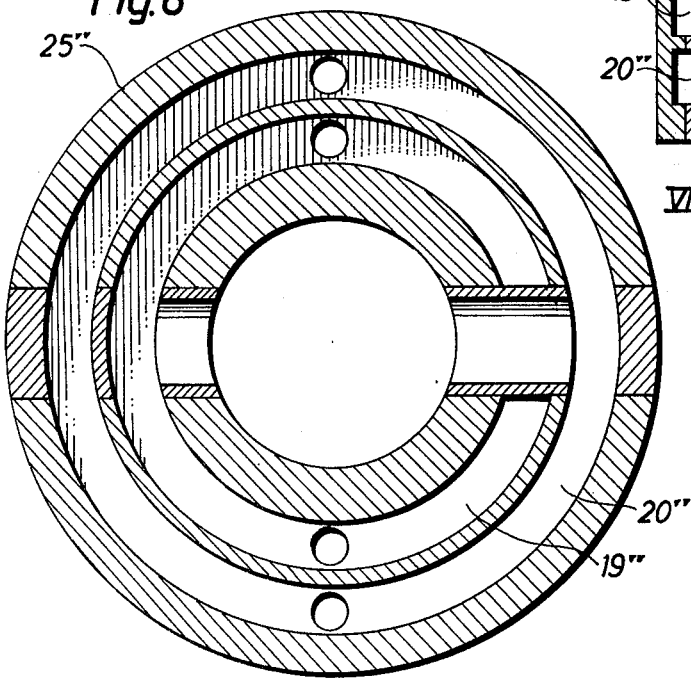

ROTATIONAL ACCELERATION SENSOR AND METHOD

It is desirable or necessary in a number of apparatus and processes to sense acceleration and deceleration of a rotating member. One example of such a need is to be found in control devices for modulating the braking effect exerted on a rotating wheel or the like, such as the arrangements found in U.S. Pat. No. 28,562 and U.S. Pat. No. 3,833,097. A variety of approaches to sensing rotational acceleration are given in the latter of the two identified patents, in conjunction with a braking effect control function.

While devices for sensing rotational acceleration have been known heretofore and have operated successfully under certain circumstances, close control over braking effects makes it highly desirable that the sensor be responsive over a wide range. Further, use of such a sensor in certain environments, and most notably in connection with an automobile wheel, exposes the sensor to various forces other than simple rotation. For example, side forces are applied to automotive vehicles and wheels during turning maneuvers and during skidding or the like. Clearly, a sensor adversely affected by such randomly directed forces is disadvantageous in conjunction with control devices of the type briefly referred to hereinabove.

Yet a further difficulty encountered in application of such sensors to automotive vehicles is the necessity of configuring devices of opposite hand. That is, consistency must be achieved between the manner of operation of a device mounted on a wheel on a right side of an automotive vehicle and a similar device mounted on a left wheel of an automotive vehicle. Desirably, such consistency would be obtained with maximum utilization of identical components, rather than by requiring significant structural differences. Also, such consistency must accommodate the likelihood that any given tire and rim must be capable of mounting on either side of the vehicle.

With the above discussion in mind, it is an object of this invention to improve the response to rotational acceleration of a device of the type having a fluid filled, looped conduit by means of a motion transmitting arrangement using movable wall means mounted for generally coaxial movement upon expansion of the volume of one of two chambers and simultaneous contraction of the volume of the other. By such an arrangement, fluctuations in relative fluid pressure at both distal sides of the closed end looped conduit contribute to movement of the movable wall means and thereby contribute to improved sensitivity of sensor.

Yet a further object of this invention is to reduce the sensitivity of a rotational acceleration device to randomly directed forces by minimizing the mass available for subjection to such forces. In realizing this object of the present invention, the transmission of fluctuations in relative fluid pressure at distal sides of a fluid filled, looped conduit is accomplished by applying such forces through flexible sealing arrangements to relatively small volumes of fluid confined in a housing which is physically separable from the looped conduit. This solution provides still further advantages which will be brought out more fully hereinafter.

Yet a further object of the present invention is to simplify the achievement of a given output movement regardless of the rotational direction of a looped conduit portion of the sensor. In realizing this object of the present invention, a portion of a separable housing is configured for ready selection of two alternate positions.

Some of the objects of the invention having been stated, other objects will appear as the description proceeds, when taken in connection with the accompanying drawings, in which FIG. 1A is a somewhat schematic illustration, partly in section, of a simple form of the present invention;

FIG. 5 is an enlarged perspective view of one element of the arrangement of FIG. 4;

FIG. 6 is a sectional view through the element of FIG. 5, taken generally as indicated by the line VI—VI in that figure;

FIG. 7 is a sectional view of another element of the arrangement of FIG. 4; and

FIG. 8 is a sectional view through the element of FIG. 7 taken generally as indicated by the line VIII-VIII in that figure.

At the outset of the detailed description of the arrangement of the present invention, it is to be noted that the present invention is contemplated as being of broad utility in connection with the sensing of acceleration and deceleration of rotating members. Thus, while the present invention will be disclosed more specifically in connection with an embodiment for cooperating with a braking effect control, the specific description is to be understood only as setting forth the best mode of use of the present invention comtemplated at the time of this description, and is not to be taken as limiting upon the scope or usefulness of this invention.

In the description which follows the term "acceleration" is given its generic scientific meaning of rate of change of velocity and thus contemplates both changes where velocity increases and changes where velocity decreases.

Figure 1A:
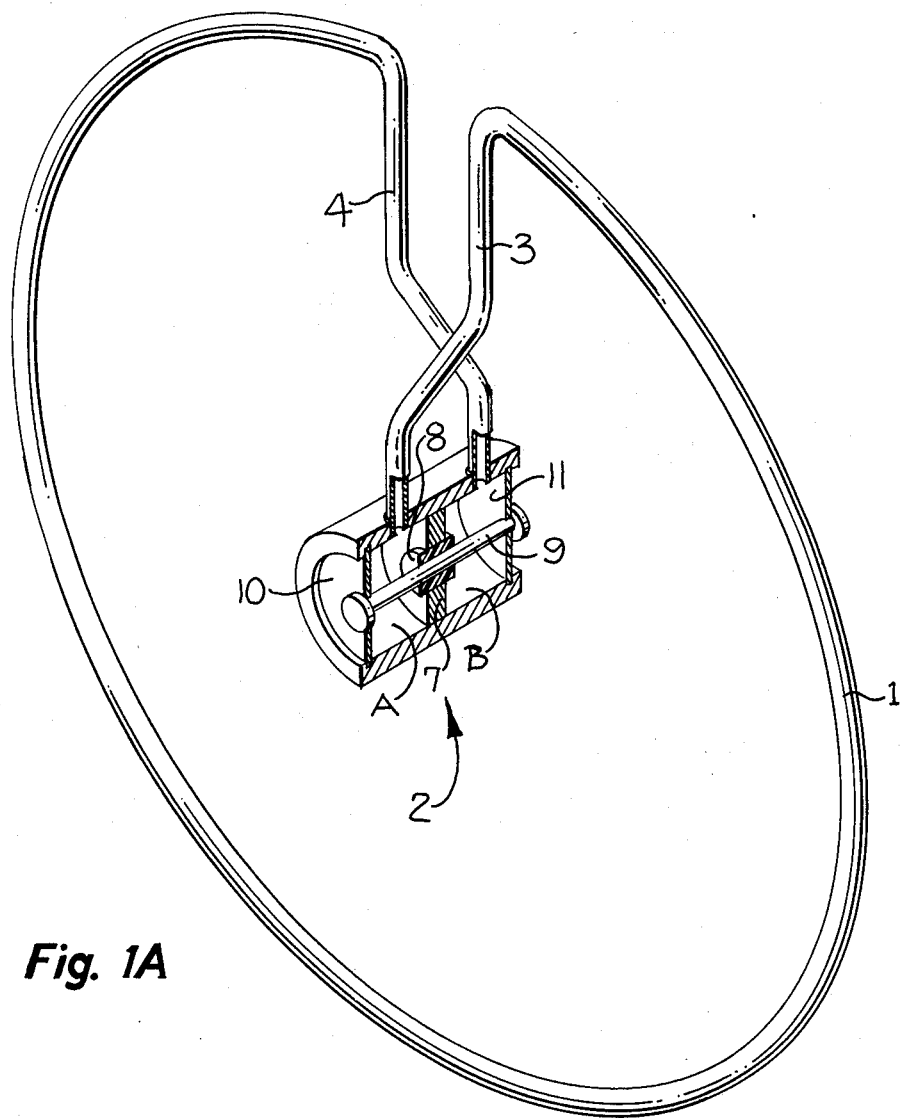
FIG. 1B illustrates a modified form for the central housing of the arrangement of FIG. 1A.
Figure 1B:
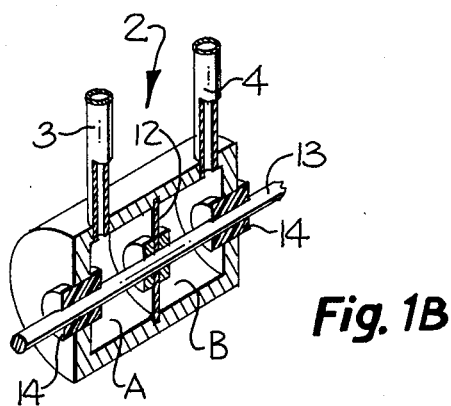

Referring now more particularly to FIGS. 1A and 1B, an arrangement is there shown for responding to rotational acceleration in which a fluid filled conduit 1 is arranged in a loop, which is to be mounted for rotation about an axis. Generally, the fluid filled, looped circuit 1 is arranged with the looped portion thereof lying in a plane, and will be mounted for rotation about an axis perpendicular to that plane and extending centrally and coaxially of the loop. While the conduit 1 is shown with a loop of less than 360° extent, it will be understood that the looped portion may extend for more or less than that arc, and may take the form of a coil. Similarly, it will be understood that the configuration of the conduit 1 may be characterized as being annular or circular.

Mounted at the rotational axis of the looped conduit 1 is a housing means generally indicated at 2 which defines first and second expansible chambers A, B. The chambers A and B contain fluid under fluctuating pressure and means are included in the housing means 2 for forming one movable wall for each of the chambers A and B. Two alternatives for such an arrangement are shown in FIGS. 1A and 1B and still others such as pistons will come to the mind of persons skilled in mechanical design.

In FIG. 1A, the chambers are separated from each other by a rigid partition wall 7 and are closed at their outer ends by movable wall means in the form of membranes or diaphragms 10, 11. Connected to the two membranes 10, 11 is a motion transmitting pin 9, which penetrates the wall 7 and is sealed by an appropriate sealing member 8. As will be understood, the movable wall means defined by the membranes or diaphragms 10, 11 is mounted for codirectional and generally coaxial movement upon expansion of the volume of the chambers A, B and simultaneous contraction of the volume of the other of the chambers. Each of the chambers A, B will be understood as capable of both expansion and contraction of the volume contained, which is the meaning intended in this description by the term expansible.

In FIG. 1B, the housing means 2 has substantially rigid exterior walls and the movable wall means takes the form of a single flexible membrane or diaphragm 12. Motion transmitting means in the form of a pin 13 penetrates the rigid outer walls of the housing means, is sealed by appropriate sealing members 14, and is coupled with the membrane 12. It is to be noted that each of the housing means 2 illustrated in FIGS. 1A and 1B have the pins 9, 13 of the motion transmitting means acting coaxially with the axis of rotation of the fluid filled, looped conduit 1. Stated differently, the motion transmitting means acts perpendicularly to the plane of the looped conduit.

In the forms of FIGS. 1A and 1B, the chambers A and B are filled with fluid, to which fluctuations in relative fluid pressure at distal sides of the looped conduit are transmitted by means including radially directed tubes 3, 4. Each of the radially directed tubes 3, 4 operatively communicates with a corresponding one of the two chambers A, B. As here used, the phrase distal sides is used in this description to mean closed end portions of the conduit 1 separated from each other by a portion which lies on an arc of the rotational path described by the looped conduit during rotation and communicating only through that arcuate portion.

When one of the arrangements of FIGS. 1A and 1B is affixed to a rotating member (such as a vehicle rim as described more fully hereinafter) and the looped conduit is filled with a suitable fluid such as methanol or another alcohol, the complete assembly comprising the looped conduit 1, the housing means 2 and structure contained within the housing will follow the movement of the rotating member and fluid pressures at distal sides of the looped conduit will be in balance as long as the rotational speed is constant. When the rotating member and the fluid filled, looped conduit 1 are accelerated, the inertia of the fluid within the looped circuit will give rise to fluctuations in relative fluid pressure between distal sides of the looped conduit. That is, there will be a difference in pressure between the ends of the conduit 1, where the ends are connected to the radial tubes 3, 4. Such fluctuations in pressure are communicated, through the radial tubes 3, 4 to the chambers A and B. by way of example, the pressure within one chamber B may be decreased while the pressure in other chamber A increases. Such pressure fluctuations lead to a contraction of the volume of one chamber B and a simultaneous expansion of the volume of the other chamber A, moving the pin 9 to the left in FIG. 1A. The motion transmitting means, in the form of the pin 9, may then act upon some external means in order to indicate the fluctuation in relative fluid pressure which has occurred and thus the acceleration exerted upon the looped conduit and rotating member. As will be understood, the arrangement of FIGS. 1A and 1B can be used for detecting and indicating acceleration in both velocity increasing and velocity decreasing senses.

The basic idea according to the invention to use a loop and a centrally located housing and connecting tubes results in the fact that no operating parts are placed in the actual loop. A central delivery of the indication of acceleration results in easier mechanical or electrical transmission. The rotational speed will not effect the function since the radial distance between the central housing and the loop is equal for the connecting tubes and thereby a balancing effect for the centrifugal forces acting upon the contents of the connecting tubes is obtained.

Figure 2:
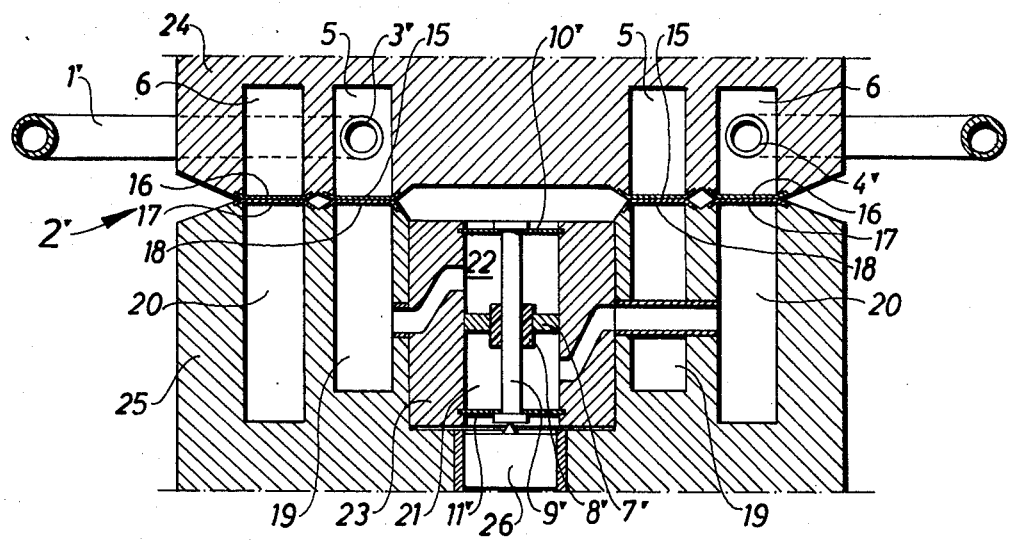
FIG. 2 is a horizontal section view through a second form of the present invention, in which ready separation of certain elements of the arrangement of the present invention is accommodated as is ready reversal of the direction of output motion.
Figure 3:
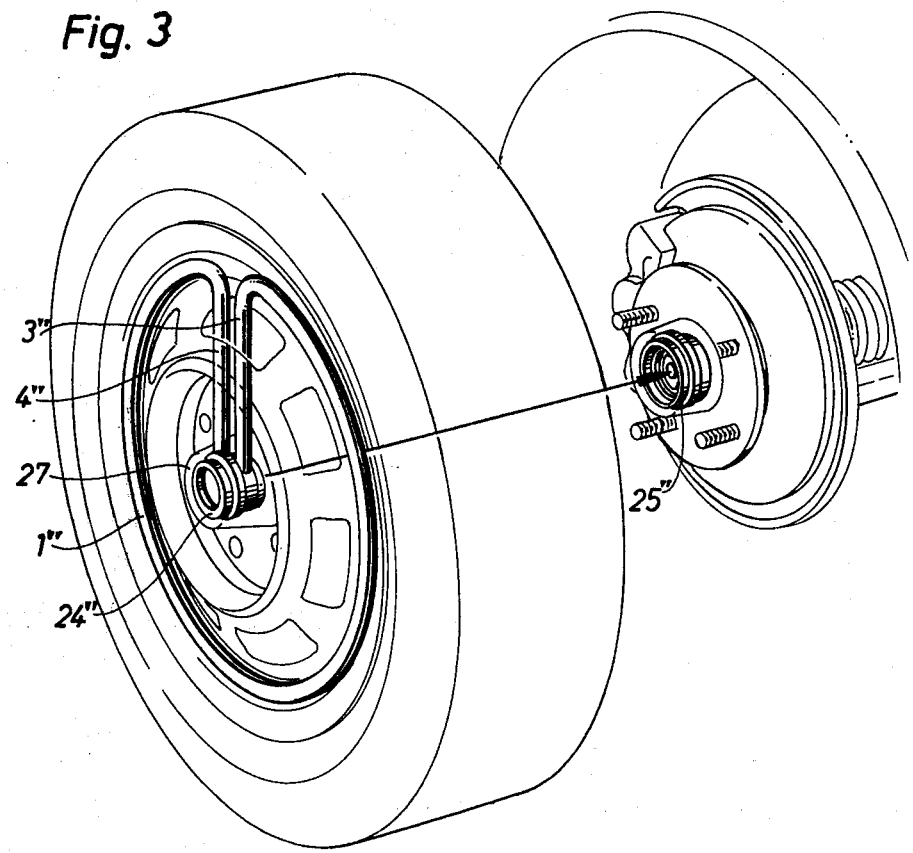
FIG. 3 is an exploded perspective view of a third form of the present invention.

While it will be understood that the structure discussed to this point with reference to FIGS. 1A and 1B clearly demonstrates the practicality of the present invention, it is foreseen that certain environments of use for the present invention would render it desirable that ready separation of the looped conduit 1 and at least portions of the housing means 2 be facilitated. An arrangement which accommodates such separation is illustrated in FIG. 2, where reference characters used heretofore designate comparable structural elements, but have prime notation. In the arrangement of FIG. 2, the housing means 2' has been divided into a first subassembly housing 24 fixed to the looped conduit 1' and a second subassembly housing which contains the pin member 9 as pointed out more fully hereinafter.

In order to permit separation of the two subassembly housings, the means for transmitting fluctuations in relative fluid pressure to the fluid filling the first and second expansible chambers 21, 22 (corresponding to the chambers A and B) includes barrier means for precluding commingling of fluid filling the looped conduit 1' and fluid filling the first and second expansible chambers. This barrier means takes the form of opposed first and second pressure transmitting means, illustrated as being thin, flexible membranelike or diaphragm annular walls 15 – 18. In order to render the coupling of the first and second subassembly housings insensitive to particular orientation, the membranes 15 – 18 have an annular configuration and close corresponding walls of radially spaced annular recesses 5, 6, 19 and 20. The inner annular recess 5 of the first subassembly housing 24 operatively communicates with one distal end of the looped conduit 1, for transmitting fluctuations in relative fluid pressure at that one distal side. The outer annular recess 6 of the first subassembly housing 24 communicates with the other distal side of the looped conduit.

It will be noted that the second subassembly housing of the arrangement of FIG. 2 comprises two members, namely a ring member 25 and a plug member 23. Within the second subassembly housing ring member 25, an inner annular recess 19 has transmitted thereto the fluctuations in relative fluid pressure which appear within the inner annular recess 5 of the first subassembly housing 24, by means of the opposing annular membranes 15, 18. Such fluctuations are then transmitted to one of the two expansible chambers, to bring about movement as described hereinabove with reference to FIGS. 1A and 1B. Similarly, the outer annular recess 20 has applied thereto fluctuations in relative fluid pressure which appear in the outer annular recess 6 of the first subassembly housing 24, through means of the opposed membranes 16, 17. Such fluctuations are then transmitted to the other of the two expansible chambers.

The plug member 23 of the second subassembly housing permits the direction of movement of the pin 9' to be reversed for a given acceleration or deceleration direction of the looped conduit 1', by the expedient of rotating the plug member 180° with respect to the ring member 25, which will be observed to switch the operative communication of the expansible chambers 21, 22 with the annular chambers 19, 20. As will be understood, sealing means such as O-rings may be provided where necessary or desirable to avoid fluid leakage.

When the embodiment of FIG. 2 is applied in conjunction with a braking effect control as referred hereinabove, suitable switch means as a microswitch 26 are provided for engagement with the pin 9'. A change in conductive state of the switch 26 in response to movement of the pin 9', as upon excessive deceleration of the rotating wheel, will bring the braking effect control into operation. As will be understood, it is contemplated that a modified design might accomplish actuation of the switch 26 directly from movable walls without need of structure fully according with the illustrated pin 9'.

As will be understood, the bolts or other means serving to fix a rim or other rotating member to a hub or other mounting serves also as means for securing the first and second subassembly housings together.

Incorporation of the arrangement of this invention into an automotive vehicle wheel is shown by the embodiment illustrated in FIGS. 3 – 8. For purposes of clarity, elements of the embodiment of FIGS. 3 – 8 corresponding to elements previously identified have been given common reference characters, with the addition of double prime notation. In FIGS. 3 – 8, the looped conduit 1'' is shown as attached to an automotive vehicle wheel rim, with the radial tube portions 3'' and 4'' extending inwardly toward the center of the rim. The radial tubes 3'', 4'' open into a first subassembly housing 24'' which defines inner and outer annular recesses 5'' and 6''. The first subassembly housing 24'' is contained within a cap 27, formed as a portion of the rim. Fluctuations in relative fluid pressure are transmitted by annular membranes 15'', 16''.

Figure 4:
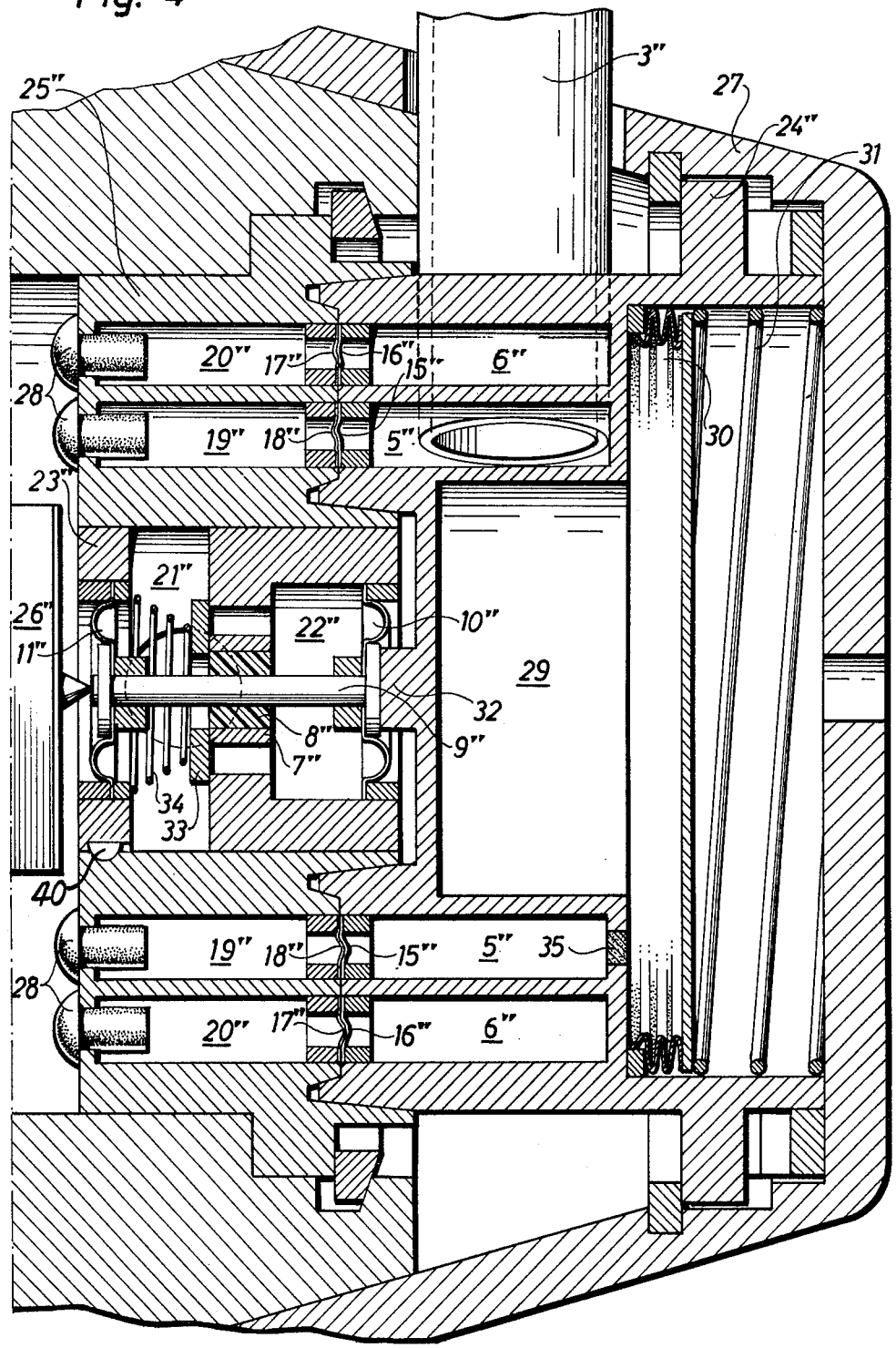
FIG. 4 is a sectional view similar to FIG. 2, through the arrangement of FIG. 3.

The first subassembly housing 24'' mates with or operatively contacts a second subassembly housing on mounting of the rim to the rotating running gear of the vehicle. For purposes of clarity in FIG. 3, only the ring member 25'' of the second subassembly housing has been illustrated, but it is to be understood that the plug member 23'' will be mounted as shown in FIG. 4 for operation of the arrangement in accordance with this invention. The direction of motion by which excessive deceleration of the wheel will be signaled has been indicated by an arrow in FIG. 3.

The cooperation of the various elements as mounted on a motor vehicle is made more clear by consideration of FIGS. 4 – 8, where certain modifications made to facilitate adaptation of the invention to an automotive vehicle are also more clear.

In particular, it is known that the relatively wide variations in atmospheric conditions, such as temperature, encountered during use of an automotive vehicle may cause fluid filling portions of the arrangement of this invention to vary in volume. Accordingly, the first subassembly housing 24'' includes provision for an expansion chamber 29 enclosed by a bellows member 30 biased toward a reduced volume position by a suitable spring 31. By means of a limited permeability member such as a plug 35 of sintered metal, relatively slow changes in volume of fluid are accommodated by passage of the fluid between the inner annular recess 5'' and the expansion chamber 29, but rapid pressure changes are not accommodated due to the high flow resistance of the sintered plug 35. The biasing force exerted by the spring 31 also maintains a minimum level of pressurization above atmospheric pressure for the fluid within the looped conduit 1'.

As used with an automotive vehicle wheel and a braking effect controller, provision is made for rapid and accurate joining of the rim subassembly housing 24, and the ring member 25 as well as for proper response by the motion transmitting pin 9''. In particular, FIGS. 4 – 8 reflect the use of conical surfaces at the line of juncture of the subassembly housings, which assures positive sealing and exact positioning of the housings and the annular membranes 15'' – 18'' by which pressure fluid fluctuations are transmitted. Further, it will be noted that the pin 9'' is restrained against movement away from the microswitch 26'', by a stop 32. In order to accommodate any possible imbalance of pressure between the first and second chambers 21'', 22'' in the plug member 23'', a pressure balancing device 33 is provided in the form of a sealing gasket normally urged into a sealing position by a spring 34 when the fluid pressure present in the chambers 21'', 22'' is substantially equal or when the pressure in the chamber which expands on signaling an excessive deceleration is higher than that in the chamber which contracts under that condition. In the event that pressure in the chamber which is to contract on signaling an excessive deceleration exceeds that in the other chamber, the balancing device 33 is forced to an unseated position against the action of the spring 34 and fluid is permitted to flow directly between the two chambers. Thus, the sensor is self-correcting for the required pressure balance.

The plug member 23'' of the arrangement of FIGS. 3 – 8 is shown in a perspective view in FIG. 5 and in a longitudinal section view in FIG. 6, from which the manner in which reversibility is accomplished may be more readily seen. As will be more clear from comparison of the views of the plug member 23'' in FIGS. 5 and 6 and the views of the ring member 25'' in FIGS. 7 and 8, rotation of the plug member 23'' about the axis of the pin 9'' and through 180° will switch the connections in such a way that the outer annular recess 20'' may alternatively communicate with either one of the first and second expansible chambers 21'', 22''. By this arrangement, the possibility of alternating the rotational direction for the looped conduit 1'' while maintaining the desired direction of movement for the pin 9'' is achieved, which is essential where the pin 9'' is restrained against movement in one direction as indicated in FIG. 4. When a desired and appropriate position for the plug member 23'' has been selected, it is fixed against rotation relative to the ring member 25'' by suitable means such as key 40.

It will be noted that the apparatus of this invention, as used with an automotive vehicle, preferably has the housing 24', the looped conduit 1", and the radial portion 3" and 4" permanently joined together as by welding or brazing and fixed to the wheel so as to remain with the wheel during normal operations.

In placing the arrangement in accordance with this invention into use, the fluid which fills the looped conduit 1", the radial tubes 3", 4" and the inner and outer annular chambers 5", 6" of the rim subassembly housing 24" is preferably but not necessarily the same fluid as that used in the chambers 19", 20", 21", 22" defined within the second subassembly housing. While it is recognized that liquid materials such as mercury could be used due to suitable viscosity and density, certain of such materials are known to involve substantial risk of dangerous contamination in the event of leakage. Accordingly, it is desirable that a fluid acceptable for safety purposes be used. As will be noted, the use of this invention in connection with an automotive vehicle wheel will require that the fluid used have a freezing point as low as possible and minimal corrosive characteristics. Taking into consideration all these factors, it has been considered that a fluid of alcohol type, for example methanol, is a preferable material as the viscosity and density thereof are suitable, the corrosive characteristics are not great and the useful temperature range is sufficient in order to avoid freezing at normal operational temperatures. The coefficient of expansion of the fluid used is of lesser importance, as provision has been made for the accommodation of volume changes.

In order to accommodate filling of the portions of the arrangement, filling openings closed by plugs 28 are provided in the chambers of the second subassembly housing ring member 25. A suitable filling tube may be incorporated in a portion of the looped conduit 1", to be closed by crimping and soldering after filling of that portion of the apparatus. Preferably, the apparatus of this invention is filled during manufacture and will not require refilling or venting during normal operation.

In the drawings and specification, there has been set forth a preferred embodiment of the invention, and although specific terms are employed, they are used in a generic and descriptive sense only and not for purposes of limitation.

That which is claimed is:

1. An arrangement for responding to rotational acceleration comprising:
    a looped circuit for containing fluid under fluctuating pressures, said conduit having closed distal ends and being mounted for rotation about an axis,
    separable first and second subassembly housing means for containing fluid under fluctuating pressures, one of said subassembly means being mounted at said rotational axis of said looped conduit and operatively communicating with said distal ends of said looped conduit for transmission of fluid pressure fluctuations therethrough, the other of said subassembly means defining therewithin first and second expansible chambers and including movable wall means for said expansible chambers mounted for movement upon expansion of the volume of one of said first and second chambers and simultaneous contraction of the volume of the other of said first and second chambers,
    means for securing said first and second subassembly means in engagement one with the other, and
    means for operatively communicating from each of said distal ends of said looped conduit through said one subassembly means and thence to fluid filling a corresponding one of said chambers within said other subassembly means fluctuations in relative fluid pressure at said distal ends of said looped conduit and including first and second diaphragm means mounted on respective ones of said subassembly means for precluding leakage of fluid from said conduit and said chambers upon separation of said subassembly means and for precluding commingling of fluid filling said conduit and fluid filling said chambers upon engagement of said subassembly means.

2. An arrangement according to claim 1 wherein said looped conduit defines a plane and further wherein said movable wall means is mounted for displacement in a direction perpendicular to said plane of the looped conduit.

3. An arrangement according to claim 1 wherein said first and second barrier means comprise opposed flexible diaphragms, each mounted for movement upon fluctuation in relative fluid pressure applied thereto.

4. An arrangement according to claim 1 wherein said first subassembly means and said looped conduit are fixed to a rotating member.

5. An arrangement according to claim 1 wherein said second subassembly means comprises a ring member and a plug member for insertion into said ring member in two alternate positions and for defining portions of said first and second expansible chambers, said plug member further mounting said movable wall means and being arranged for cooperation with said ring member in both of the two alternate positions for readily reversing the direction of displacement of said movable wall means.

6. An arrangement for responding to rotational acceleration comprising:
    a looped conduit for containing fluid under fluctuating pressures, said conduit having first and second closed distal ends and being mounted for rotation about an axis,
    separable first and second subassembly housing means for containing fluid under fluctuating pressures,
    one of said subassembly means being mounted at said rotational axis of said looped conduit and operatively communicating with said distal ends of said looped conduit for transmission of fluid pressure fluctuations therethrough,
    the other of said subassembly means comprising a ring member and a plug member insertable into said ring member in two alternate positions, said ring and plug members in both of said alternate positions defining first and second expansible chambers within said other subassembly means, said other subassembly means further comprising movable wall means for said expansible chambers mounted within said plug member for movement upon expansion of the volume of one of said first and second chambers and simultaneous contraction of the volume of the other of said first and second chambers,
    means for securing said first and second subassembly means in engagement one with the other, and
    means for operatively communicating from each of said distal ends of said looped conduit through said one subassembly means and thence to fluid filling a corresponding one of said chambers within said other subassembly means fluctuations in relative fluid pressure at said distal ends of said looped conduit, said ring and plug members when in one of said alternate positons establishing operative communication of fluctuations in relative fluid pressure from said first distal end to said first chamber and from said second distal end to said second chamber and reversing that operative communication when said ring and plug members are in the other of said alternate positions.

7. In combination with a braking effect control for interrupting and releasing pressure of an actuating fluid supplied to a brake for a rotating member and an arrangement for responding to rotational acceleration of the rotating member and having a fluid filled, looped conduit mounted for rotation with the rotating member, an improvement in means for responding to fluctuations in relative fluid pressures within the looped conduit at locations on closed distal ends thereof and comprising:

separable first and second subassembly housing means for containing fluid under fluctuating pressures, one of said subassembly means being mounted at said rotational axis of said looped conduit and operatively communicating with said distal ends of said looped conduit for transmission of fluid pressure fluctuations therethrough, the other of said subassembly means defining therewithin first and second expansible chambers and including movable wall means for said expansible chambers mounted for movement upon expansion to the volume of one of said first and second chambers and simultaneous contraction of the volume of the other of said first and second chambers, means for securing said first and second subassembly means in engagement one with the other, means for operatively communicating from each of said distal ends of said looped conduit through said one subassembly means to fluid filling a corresponding one of said chambers within said other subassembly means fluctuations in relative fluid pressure at said distal ends of said looped conduit and including first and second diaphragm means mounted on respective ones of said subassembly means for precluding leakage of fluid from said conduit and said chambers upon separation of said subassembly means and for precluding commingling of fluid filling said conduit and fluid filling said chambers upon engagement of said subassembly means, and control motion transmitting means operatively connected with said movable wall means for displacement upon predetermined movement of said movable wall means and with said braking effect control for effectuating interruption and release of actuating fluid pressure upon deceleration of the rotating member.

8. The combination of claim 7 wherein each of said barrier means comprises first and second annular diaphragms mounted in each of said subassembly housings for precluding leakage of fluid from either of said subassembly housings upon separation thereof.

9. The combination according to claim 7 wherein said other subassembly means comprises a ring member defining two annular recesses and a plug member received within said ring member and defining said first and second chambers, said plug member being movable between a selected one of two alternative positions within said ring member, one of said positions opening operative communication between an outer one of said annular recesses and said first chamber and opening operative communication between an inner one of said annular recesses and said second chamber, and the other of the alternate positions opening operative communication between said outer annular recess and said second chamber and opening operative communication between said inner annular recess and said first chamber.

10. The combination according to claim 7 wherein said movable wall means comprises at least one flexible membrane and said control motion transmitting means comprises a pin member fixed to said at least one flexible membrane for movement in response to movement thereof and electrical switch means operatively coupled with said pin member for changing conductive state in response to predetermined movement of said pin member.

11. A combination according to claim 7 further comprising pressure control means interposed between said first and second chambers for balancing fluid pressures therebetween, said pressure control means including means biasing the same towards a normally closed position in which fluid flow between said first and second chambers is blocked.

12. A combination according to claim 7 further comprising expansion chamber means defining an expansion volume within said first subassembly means and operatively communicating with the fluid filled, looped conduit for accommodating variations in specific volume of the fluid filling the looped conduit, said expansion chamber means comprising flow restriction means interposed between the fluid filled looped conduit and the expansion volume for restricting the rate of flow therebetween, and means for biasing the expansion volume against the admission of fluid from the looped conduit.

13. The combination according to claim 7 wherein alcohol fills said looped conduit and said first and second chambers.

14. The combination according to claim 7 wherein fluid filling said first and second chambers is pressurized above ambient atmospheric pressure.

15. The combination according to claim 7 wherein each of said subassembly means has a pair of concentric annular recesses disposed in aligned opposition to the concentric annular recesses of the other of said subassembly means, said annular recesses of said one subassembly means operatively communicating with distal sides of the fluid filled, looped conduit, and said annular recesses of said other subassembly means operatively communicating with corresponding ones of said first and second chambers.

16. An acceleration sensor comprising:
a conduit defining an annular chamber for confining a body of liquid and having a principal plane, the conduit being adapted to rotate about an axis that is perpendicular to said principal plane and that intersects the center of curvature of the annular chamber;
a housing comprising separable first and second subassembly housings,
said first subassembly housing being fixed to said conduit, said second subassembly housing comprising a ring member and a plug member for insertion into and rotation relative to said ring member, said plug member defining first and second expansible chambers adapted to contain fluid under fluctuating pressure and having movable wall means for said first and second chambers, said plug member including plug wall means cooperating with said ring member such that said plug member has two alternate operable orientations in said ring member; and means for securing said first and second subassembly housings together;

said housing being mounted for rotation on said axis with said movable wall means being movable in the direction of said axis upon expansion of the volume of one of said chambers and simultaneous contraction of the volume of the other of said chambers; and means for transmitting fluid pressure between one end of said conduit and one of said expansible chambers, and between the other end of said conduit and the other of said expansible chambers;

whereby said movable wall means moves in one axial direction when said plug member is in one orientation and said conduit is rotated in one direction, and said movable wall means moves in the same axial direction when said plug member is in the other orientation and said conduit is rotated in the opposite direction.

17. The sensor according to claim 16 including pressure balancing means for permitting fluid flow between said expansible chambers when fluid pressure in the chamber that should contract is greater than that in the other chamber.

18. Apparatus for sensing acceleration in each of a plurality of wheels of an automotive vehicle comprising: a plurality of separable, two-part, acceleration sensors each of said sensors including a corresponding first part mounted on a rim and a corresponding second part mounted on a hub, each first part being identical to each other first part, all second parts on the left hand side of the vehicle being identical to each other, all second parts on the right hand side being identical to each other, and the left hand side second parts being different from the right hand side second parts, whereby any wheel rim can be mounted on any wheel hub without affecting the operation of the corresponding one sensor.

19. The apparatus according to claim 18 including a plurality of switches each mounted on a corresponding hub adjacent a corresponding second part and said sensor including means for activating said switch when said first part is subjected to more than a predetermined acceleration.

20. The apparatus according to claim 18 wherein each of said second parts includes a reversible member having two different possible orientations, one for left hand operation and one for right hand operation.

21. The apparatus according to claim 18 wherein each of said first and second parts are fluid filled and each includes a flexible diaphragam, said diaphragms being located such that said diaphragms are in pressure transmitting contact with each other when a wheel rim having a first part is mounted on a wheel hub having a second part.

22. A method for sensing acceleration in each wheel of an automotive vehicle comprising:

providing a separable two-part acceleration sensor for each wheel, and mounting a first part of each sensor on a wheel rim and a second part of each sensor on a wheel hub so that when a wheel rim is attached to a wheel hub, each first part is in operative mating contact with a corresponding second part, said first parts being identical and said second parts being of a selected one of two different types, with identical second parts being on the left wheels and the left wheel second parts being different from the second parts on the right wheels, whereby any wheel rim can be placed on any wheel hub without affecting the operation of the corresponding sensor.

23. The method according to claim 22 including mounting a switch on each hub adjacent said corresponding second part, and activating said switch when said corresponding first part is subjected to more than a predetermined acceleration.

24. The method according to claim 22 wherein each of said second parts includes a reversible member having two different possible orientations, one for left wheel operation and one for right wheel operation, and including orienting said reversible member for one of said left and right hand operation previous to installing said second part on said hub, and then installing said second part on that side of a vehicle corresponding to the selected orientation.

25. The method according to claim 22 wherein said first and second parts are filled with fluid, and including sealing said fluid in each part by a flexible diaphragm, and locating said diaphragms such that the diaphragm of a first part is in pressure transmitting contact with the diaphragm of a second part when a wheel rim having said first part is mounted on a wheel hub having said second part.

* * * * *

UNITED STATES PATENT AND TRADEMARK OFFICE
CERTIFICATE OF CORRECTION

PATENT NO. : 3,977,256
DATED : August 31, 1976
INVENTOR(S) : Gunnat Wernstedt

It is certified that error appears in the above-identified patent and that said Letters Patent are hereby corrected as shown below:

Column 2, Line 35, "braod" should be --broad--.

Column 3, Line 15, after "of", second occurrence, insert --one of--.

Column 3, Line 65, "by" should be --By--.

Column 5, Line 23, after "means" insert -- such--.

Column 7, Line 50, "circuit" should be --conduit--.

Column 9, Line 33, "to" should be --of--.

Signed and Sealed this

First Day of February 1977

[SEAL]

Attest:

RUTH C. MASON
*Attesting Officer*

C. MARSHALL DANN
*Commissioner of Patents and Trademarks*